US012308590B2

(12) United States Patent
Wittmann

(10) Patent No.: US 12,308,590 B2
(45) Date of Patent: May 20, 2025

(54) CONTACT ELEMENT

(71) Applicant: Robert Bosch GmbH, Stuttgart (DE)

(72) Inventor: Rolf Wittmann, Ubstadt-Weiher (DE)

(73) Assignee: ROBERT BOSCH GMBH, Stuttgart (DE)

( * ) Notice: Subject to any disclaimer, the term of this patent is extended or adjusted under 35 U.S.C. 154(b) by 50 days.

(21) Appl. No.: 17/625,396

(22) PCT Filed: Jun. 18, 2020

(86) PCT No.: PCT/EP2020/066888
§ 371 (c)(1),
(2) Date: Mar. 15, 2022

(87) PCT Pub. No.: WO2021/013442
PCT Pub. Date: Jan. 28, 2021

(65) Prior Publication Data

US 2022/0271459 A1 Aug. 25, 2022

(30) Foreign Application Priority Data

Jul. 19, 2019 (DE) ..................... 10 2019 210 695.1

(51) Int. Cl.
*H01R 4/50* (2006.01)
*H01R 13/193* (2006.01)

(52) U.S. Cl.
CPC ......... *H01R 4/5041* (2013.01); *H01R 13/193* (2013.01)

(58) Field of Classification Search
None
See application file for complete search history.

(56) References Cited

U.S. PATENT DOCUMENTS 6,368,129 B1 4/2002 Wang et al.
6,644,995 B1 * 11/2003 Jones ................ H01R 13/4362 439/267
(Continued)

FOREIGN PATENT DOCUMENTS

AT 182150 B 5/1955
DE 10 2005 062 889 A1 7/2007
(Continued)

OTHER PUBLICATIONS

International Search Report for PCT/EP2020/066888 Issued Aug. 24, 2020.

*Primary Examiner* — Ross N Gushi
(74) *Attorney, Agent, or Firm* — NORTON ROSE FULBRIGHT US LLP

(57) ABSTRACT

A contact element for inserting a mating contact element along an insertion direction. The contact element includes an insertion opening for inserting the mating contact element and at least one contact lamella for electrically contacting the mating contact element, and a clamping sleeve that is displaceable along the insertion direction, relative to the at least one contact lamella, between a first position and a second position. The clamping sleeve and the contact lamella are in an operational relationship with one another such that when the clamping sleeve moves from the first position into the second position, the contact lamella is moved in a radial direction perpendicular to the insertion direction. The clamping sleeve includes a run-up element, which in a projection along the insertion direction through the insertion opening at least partially covers the insertion opening.

16 Claims, 3 Drawing Sheets

(56) References Cited

U.S. PATENT DOCUMENTS

| | | | | |
|---|---|---|---|---|
| 9,160,082 | B2 | 10/2015 | Heringhaus et al. | |
| 9,614,311 | B2 * | 4/2017 | Duenkel | H01R 13/05 |
| 10,454,203 | B2 * | 10/2019 | Phillips | H01R 13/514 |
| 10,749,282 | B2 * | 8/2020 | Suzuki | H01R 12/89 |

FOREIGN PATENT DOCUMENTS

| | | | |
|---|---|---|---|
| DE | 102012015568 | A1 | 2/2014 |
| DE | 102013225513 | A1 | 12/2014 |
| EP | 0405333 | A2 | 1/1991 |
| EP | 1764874 | A2 | 3/2007 |
| EP | 1764875 | A1 | 3/2007 |
| JP | S62150875 | U | 9/1987 |
| JP | H0449488 | U | 4/1992 |

* cited by examiner

CONTACT ELEMENT

FIELD

The present invention relates to a contact element.

BACKGROUND INFORMATION

In the field of plug connectors, for example in the automotive industry, ergonomic handling of plug connectors, in particular with regard to the maximum actuation forces for the attachment operation, is expected by customers. The insertion forces are intended to become increasingly smaller. On the other hand, for many applications the number of poles of the plug connectors increases due to higher functionality, resulting in greater (direct) insertion forces. Plug connectors represent one approach to solving these conflicting objectives, according to which the pins are initially introduced without force into the socket contacts, and the necessary contact pressure of the contact lamellae is not applied until toward the end of the insertion operation or in a second step. In particular, the excessive force during the pushing-on operation ("peck up" peak) may be avoided in this way.

A plug connector that includes a contact element is described in German Patent Application No. DE 10 2005 062 889, contact lamellae for electrically contacting a mating contact element that is insertable into the contact element being provided at the contact element. The contact pressure or contact force of the contact lamellae on an inserted mating contact element is not generated until at the end of the insertion path of the mating contact element into the plug connector or into the contact element, in that a plastic element situated at a housing of the plug connector is displaced relative to the housing.

SUMMARY

The present invention is based on the finding that, due to constrained space conditions and an increasing number of current-conducting and/or signal-conducting lines, the dimensions of plug connectors are to become increasingly smaller, and over the service life, high demands exist on the contact force between the contact element and the inserted mating contact element. In other words, the contact force, once set, is to remain as constant as possible over the service life and under the various operating conditions.

At the same time, it has been shown that with the number of parts to be put together and the work steps to be carried out during the assembly by a cable manufacturer, for example, the costs rise and the risk of problems during assembly of the parts increases.

Also, it has been shown that simple maintenance or repair is important in increasing the yields and improving customer satisfaction; for example, a defective mating contact element should be easily replaceable.

Therefore, there may be a need to provide a contact element, a contact arrangement made up of a contact element and a mating contact element, a plug connector, or a plug connector arrangement, in which the insertion of a mating contact element into the contact element, at least during a major portion of the insertion path up to the final insertion position (for example, along more than 70% or more than 80% of the insertion path), requires very little or virtually no insertion force, for example less than 3 N, or even less than 2 N or less than 1 N, for example 0.05 N to 0.9 N, for each contact element-mating contact element pair.

At the same time, there may be a need to keep the contact force between a contact lamella and the mating contact element as constant as possible over the service life, and to design the contact element and the plug connector as simply and with as few parts as possible. In addition, there may be a need to keep the assembly operation simple and to design it so that it may be carried out in few steps, and for the mating contact element, once inserted, to be removable from the contact element and replaceable by the same mating contact element or a new mating contact element, the intent being that over a major portion of the insertion path up to the final insertion position, only a small insertion force is necessary for the first insertion operation.

SUMMARY

This need may be met by example embodiments of the present invention. Advantageous specific embodiments of the present invention are disclosed herein.

According to a first aspect of the present invention, a contact element for inserting a mating contact element along an insertion direction is provided.

In accordance with an example embodiment of the present invention, the contact element includes an insertion opening for inserting the mating contact element, and at least one contact lamella for electrically contacting the mating contact element. In addition, the contact element includes a clamping sleeve that is displaceable along the insertion direction, relative to the at least one contact lamella, between a first position and a second position. The clamping sleeve and the at least one contact lamella are in an operational relationship with one another such that when the clamping sleeve moves from the first position into the second position, the at least one contact lamella is moved in a radial direction perpendicular to the insertion direction, in particular radially inwardly. The clamping sleeve includes a run-up element, which in a projection along the insertion direction through the insertion opening at least partially covers the insertion opening, so that upon insertion of the mating contact element into the contact element, the mating contact element strikes the run-up element, and upon further insertion of the mating contact element the clamping sleeve is moved in the direction of the second position with the aid of the run-up element.

This may yield in particular the advantage that the mating contact element may initially be pushed or inserted into the contact element, essentially free of force, along an insertion path of the mating contact element. This is because in this state, the contact lamellae may be spaced apart from the not yet completely inserted mating contact element in a radial direction perpendicular to the insertion direction, or may rest against the mating contact element with only an extremely low application of force.

With regard to the insertion force, a "peck up" peak, which is necessary due to the pressing apart of radially inwardly resilient contact lamellae and which represents an initial excessive force, particularly advantageously does not occur.

Due to the run-up element situated at the clamping sleeve, in addition an element that is separate or to be additionally installed may advantageously be dispensed with. This is because the clamping sleeve is displaced by the run-up element, so that toward the end of the insertion path of the mating contact element, the necessary contact force is applied by the at least one contact lamella on the mating contact element with the aid of the clamping sleeve.

In accordance with an example embodiment of the present invention, it is also advantageous that the interlocking of the contact element and the mating contact element may take place in a single step. The actuation of a further element for applying the contact force is dispensed with. This is because the mating contact element carries the clamping sleeve along with it simply due to the insertion operation along the insertion direction, in that the mating contact element strikes the run-up element, and during the further insertion operation displaces or moves the clamping sleeve relative to the at least one contact lamella. The striking against the run-up element may occur, for example, toward the end of the insertion path, for example after 70% or 80% of a defined length of the insertion path, computed, for example, after passing through the insertion opening. In addition, the risk of the mating contact element and the contact element tilting is thus advantageously reduced.

The clamping sleeve may include a metal or may be made of metal, for example, as a material. The clamping sleeve may be made, for example, of a material having good relaxation resistance (spring steel, for example). The clamping sleeve may have a design, for example, that is closed in a ring shape, at least in one section. It is thus advantageously possible to reduce the risk that the contact force that is transferred to the at least one contact lamella with the aid of the clamping sleeve decreases due to aging processes, for example on account of material fatigue. In other words, a decline in the elastic force during aging may thus be advantageously reduced.

The contact element may be connected to a cable or a line in a force-fit or integrally joined manner, for example, with the aid of a fastening section or a crimping section. The contact element may include a contact box in which the at least one contact lamella is situated. The at least one contact lamella may be cut out or cut free from a portion of the contact box, for example. However, the contact box may also be designed as a type of enveloping box having a design that is separate from the at least one contact lamella, which, for example, is inserted into and/or fastened in the box. The contact element may include, for example, a detent lance that is elastically reversibly deflectable and that protrudes from the contact element and is designed to lock the contact element in a contact chamber of a housing of a plug connector. For example, an undercut may be provided at the contact element that is engaged from behind by a housing detent lance of the contact chamber of the plug connector and thus locks the contact element in the contact chamber.

It is understood that the contact element may include exactly one contact lamella or multiple contact lamellae, for example two, three, four, or even more contact lamellae. These contact lamellae may be situated in a circle, for example, in a circumferential direction around the insertion direction. For two contact lamellae, for example, it may be provided, for example, that they are situated opposite one another, so that when the mating contact element is inserted it is situated, for example, on a line between the two contact lamellae.

The at least one contact lamella may include a metal, for example copper or aluminum or spring steel. The contact lamella may have an elastically reversibly resilient design. The contact lamella may be designed in such a way, for example, that it is in a force-free state in the first position of the clamping sleeve, and during a normal insertion operation of the mating contact element (i.e., a nontilted insertion) is spaced apart from the mating contact element in the radial direction or merely slightly contacts or touches the mating contact element. The contact lamella may also be designed in such a way that in the second position of the clamping sleeve it is pressed, rotated, displaced, or moved elastically reversibly and radially inwardly, i.e., in the direction of the inserted mating contact element, by the clamping sleeve, so that it comes into mechanical contact with the mating contact element. If the clamping sleeve were now moved back into the first position, in this example the at least one contact lamella, due to its elasticity, would spring back into the force-free state, so that it is once again spaced apart from the mating contact element or merely touches it.

The first position of the clamping sleeve may be designed in such a way that the mating contact element to be inserted strikes the run-up element for example after 70% of the defined length of the insertion path, computed, for example, after passing through the insertion opening. The run-up element may protrude inwardly from the clamping sleeve, for example transversely with respect to the insertion direction, i.e., in the radial direction. The run-up element may be designed in such a way that it protrudes into the insertion route or insertion path or insertion channel of the mating contact element, so that the mating contact element may, for example, strike the run-up element. The run-up element may be, for example, a sheet metal plate that protrudes inwardly from the clamping sleeve. The run-up element may be designed in such a way, for example, that it is buckling-resistant, i.e., it is not so strongly bent due to striking the mating contact element that the mating contact element drops below the—then bent—run-up element. The run-up element may, for example, be designed in one piece with the clamping sleeve. The clamping sleeve and the run-up element may be manufactured as a one-piece stamped/bent part, for example. However, it is also possible for the run-up element to be a part that is initially separate from the clamping sleeve, and that is in operative connection with the clamping sleeve only upon completion of the contact element.

The second position of the clamping sleeve may be designed in such a way that it is reached during a final insertion position of the mating contact element that is inserted into the contact element.

The insertion opening may be formed, for example, by the foremost end of the at least one contact lamella that faces the mating contact element. When the contact element includes a contact box, a front opening in the contact box through which the mating contact element is inserted into the contact element may also be regarded as an insertion opening.

The clamping sleeve may apply the contact force to the at least one contact lamella, for example by a pure linear displacement of the clamping sleeve or by a tilting of the clamping sleeve combined with a linear movement, or by a rotation of the clamping sleeve combined with a linear movement, to name just a few examples of displacements of the clamping sleeve. The clamping sleeve may also include a further element which due to the displacement of the clamping sleeve is tilted, for example, or which rotates, as a result of which the contact force is exerted on the at least one contact lamella.

The mating contact element may, for example, be an integral part of a mating plug connector that includes a mating plug connector housing. The mating contact element may be situated at or in the mating contact element housing. The mating contact element may be designed, for example, as a contact blade or as a contact pin or as an annular contact. With regard to its dimensions in the radial direction, for example the mating contact element may be designed to be acted on with a defined contact force by the at least one contact lamella when the mating contact element is pushed into the contact element up to a defined final insertion position. The mating contact element may include a metal, for example copper or aluminum, as a material.

Due to the provided contact element, the maximum necessary insertion force may particularly advantageously be limited to less than 3 N, preferably to less than 2 N, and very particularly preferably to less than 1 N, for example to 0.05 N to 0.9 N, for each contact element-mating contact element pair.

As a result of the clamping sleeve including an obliquely, radially inwardly extending first section in a front area facing the mating contact element, this yields the advantage that the at least one contact lamella is moved radially inwardly not suddenly, but, rather, over a certain distance, and the contact force is thus applied to the mating contact element. The increase in the insertion force may be adjusted via the steepness of the inclination in the first section.

The first section may be designed in such a way, for example, that the diameter of the clamping sleeve decreases in the first section.

As a result of a second section, extending in parallel to the insertion direction, adjoining the first section of the clamping sleeve, viewed opposite the insertion direction, this yields the advantage that a defined contact force is always applied to the at least one contact lamella at the end of the insertion path, even with manufacturing tolerances, for example in the length of the clamping sleeve or of the contact lamellae or of a contact box. This is because the horizontal second section may compensate for such length tolerances, or also a tolerance of the defined length of the insertion path or insertion route of the mating contact element.

For example, the diameter of the clamping sleeve may be designed to be constant in the second section.

As a result of a first retaining element being provided at the clamping sleeve which prevents a displacement of the clamping sleeve from the first position in the direction of the second position when no mating contact element is inserted into the contact element, this yields the advantage that the clamping sleeve does not inadvertently move, thus hampering or preventing a force-free insertion of the mating contact element. For example, the first retaining element may be used as a type of transport safety device during transport of the contact element.

Strictly as an example, the first retaining element may be actuatable manually, i.e., independently of the mating contact element, before the mating contact element is inserted or plugged into the contact element. In this way, the safety device may be unlocked, and the displacement of the clamping sleeve from the first position into the second position enabled.

Particularly reliable and automatic functioning of the first retaining element may be effectuated due to the first retaining element being in operative connection with the run-up element. This is because, for example when the mating contact element strikes the run-up element, the first retaining element may automatically release the blockage of the displacement of the clamping sleeve from the first position into the second position.

Strictly as an example, the first retaining element may be designed as a type of detent hook that is in operative connection with the run-up element, and in the first position of the clamping sleeve engages behind a first undercut of the contact element or of the contact box or of the contact lamella. When the mating contact element strikes the run-up element, this detent hook may then slide out from the first undercut, for example via a slight tilting of the run-up element, and may thus enable the displacement of the clamping sleeve in the direction of the second position.

It is understood that the first retaining element may also be designed as a recess in which a detent hook, provided at the contact element or at the contact box or at the contact lamella, engages.

As a result of a second retaining element being provided at the clamping sleeve which prevents a displacement of the clamping sleeve from the second position in the direction of the first position when the clamping sleeve is in the second position, this yields the advantage that the contact force, once applied with the aid of the clamping sleeve, is not reduced once again by an inadvertent displacement of the contact sleeve. An inadvertent displacement of the clamping sleeve is prevented by the second retaining element, even if the run-up element is bent, damaged, or lost. It is understood that the second retaining element may be designed in such a way that it may be unlocked, for example via an unlocking tool or some other externally actuatable mechanism, so that the clamping sleeve is then once again movable from the second position in the direction of the first position.

Strictly as an example, the second retaining element may be designed as an element that is separate from the first retaining element. However, it may also be provided that the first retaining element also fulfills the function of the second retaining element, and therefore simultaneously represents a first retaining element and a second retaining element. The second retaining element may be designed, for example, as a type of detent hook that may engage behind a second undercut formed at the contact element or at the contact box or at the contact lamella.

In one specific embodiment of the present invention, it may be provided that an undercut is provided at the contact element for locking the contact element in a contact chamber of a plug connector. In this way, a defined length of the insertion path or a defined insertion length or a defined insertion path for the mating contact element may advantageously be set in a particularly simple way.

Alternatively or additionally, it may be provided that a detent lance, which in particular is elastically reversibly deflectable, is provided at the contact element for locking the contact element in a contact chamber of a plug connector. In this way, a defined insertion path or a defined length of the insertion path for the mating contact element may advantageously be set in a particularly simple way.

According to a second aspect of the present invention, a contact arrangement is provided. The contact arrangement includes or contains a contact element as described above. The contact arrangement also includes a mating contact element that is inserted into the contact element along the insertion direction. A contact arrangement is thus advantageously provided that requires particularly low insertion forces, includes few parts, and is installable with few work steps. It is also advantageous that the contact arrangement may be easily serviced.

As a result of the at least one contact lamella not contacting the mating contact element, at least as long as the mating contact element does not strike the run-up element, this yields the advantage of a particularly low insertion force for putting the contact arrangement together.

The state of non-contact may be achieved, for example, at least when the mating contact element is inserted into the contact element without tilting, i.e., along the insertion direction.

As a result of the at least one contact lamella resting against the mating contact element with a defined force transverse to the insertion direction when the clamping sleeve is in the second position, an electrical interface having a reproducible electrical behavior, for example a reproducible electrical contact resistance, is advantageously achieved. This advantageously increases the reliability and the error tolerance of electrical components that are connected to one another with the aid of the contact arrangement.

According to a further aspect of the present invention, a plug connector is provided. In accordance with an example embodiment of the present invention, the plug connector includes a housing with a contact chamber. The plug connector also includes a contact element that is situated in the contact chamber, as described above. A plug connector is thus advantageously provided that may be plugged together with a mating plug connector with only a low insertion force and with few work steps, includes few parts, and is cost-effectively manufacturable and easy to service.

The contact element may, for example, be locked in the contact chamber. A defined length of the insertion path or a defined insertion path for the mating contact element may thus be advantageously set, as the result of which in turn a defined contact force may be effectuated at the end of the insertion path in an advantageously reproducible and reliable manner.

According to a further aspect of the present invention, a plug connector arrangement is provided. In accordance with an example embodiment of the present invention, the plug connector arrangement includes a plug connector as described above. The plug connector arrangement also includes a mating plug connector. The mating plug connector includes a mating plug connector housing and a mating contact element. In the completely assembled state of the plug connector and the mating plug connector, the clamping sleeve is moved into the second position with the aid of the mating contact element. In this way, a plug connector arrangement may be advantageously provided which allows an interlock without a "peck up" force peak, manages with few parts and assembly steps, and is easy to service and repair.

The at least one contact lamella may rest against the mating contact element, for example with a defined force transverse to the insertion direction. In this way, a plug connector arrangement having particularly well reproducible electrical properties may advantageously be provided.

BRIEF DESCRIPTION OF THE DRAWINGS

Further features and advantages of the present invention will become apparent to those skilled in the art from the following description of exemplary specific embodiments with reference to the figures, which, however, are not to be construed as limiting to the present invention.

DETAILED DESCRIPTION OF EXAMPLE EMBODIMENTS

Figure 1:
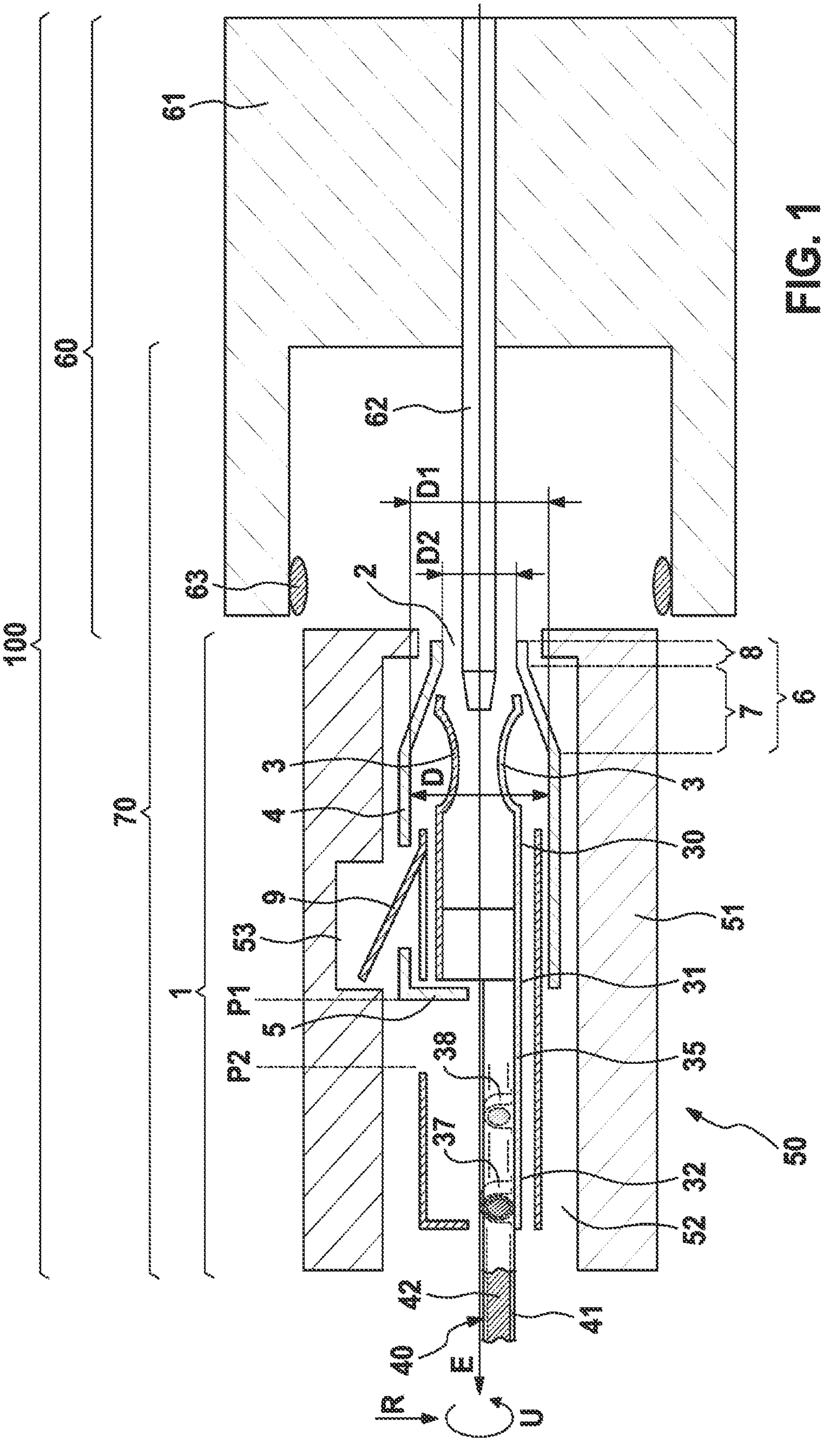
FIG. 1 shows a schematic cross section of a plug connector arrangement, in accordance with an example embodiment of the present invention.

FIG. 1 shows a schematic cross section of a plug connector arrangement 100. Plug connector arrangement 100 includes a plug connector 50, and a mating plug connector 60 that may be plugged together with plug connector 50.

Plug connector 50 includes a housing 51 with a contact chamber 52, and a contact element 1 that is situated in contact chamber 52.

Mating plug connector 60 includes a mating plug connector housing 61, having a cup-like design here, and a mating contact element 62 that is situated in mating plug connector housing 61. Mating contact element 62 may be designed in the form of a flat contact blade or a pin or an annular contact, for example. Situated at a side of mating plug connector housing 61 facing plug connector 50 is a radial seal 63, which in the plugged-together state of plug connector 50 and mating plug connector 60 seals off the shared inner space of plug connector arrangement 100 from the penetration of dirt and moisture.

Contact element 1 is suitable for inserting mating contact element 62 along an insertion direction E. Contact element 1 includes an insertion opening 2 for inserting mating contact element 62. Contact element 1 also includes at least one contact lamella 3 for electrically contacting mating contact element 62. Two contact lamellae 3 are discernible in the cross section in FIG. 1. However, in principle exactly one contact lamella 3 or more than two contact lamellae 3 may be provided. Contact element 1 also includes a clamping sleeve 4 that is displaceable along insertion direction E, relative to the at least one contact lamella 3, between a first position P1 and a second position P2. Clamping sleeve 4 and the at least one contact lamella 3 are in an operational relationship with one another in such a way that when clamping sleeve 4 moves from first position P1 into second position P2, the at least one contact lamella 3 is moved in a radial direction R perpendicular to insertion direction E, in particular radially inwardly. Clamping sleeve 4 includes a run-up element 5, which in a projection along insertion direction E through insertion opening 2 at least partially covers insertion opening 2, so that upon insertion of mating contact element 62 into contact element 1, mating contact element 62 strikes run-up element 5 (cf. FIGS. 2B, 3B, and 3C), and upon further insertion of mating contact element 62, clamping sleeve 4 is moved in the direction of second position P2 with the aid of run-up element 5.

Clamping sleeve 4 may be made of sheet metal, for example. Run-up element 5 may be radially inwardly bent here, for example, and may protrude in the manner of a shield into the insertion path of mating contact element 62.

In FIG. 1, insertion opening 2 is provided by an opening in housing 51 of plug connector 50. From the standpoint of contact element 1 alone, insertion opening 2 may thus be provided by the front end of the at least one contact lamella 3 (FIGS. 2A through 3C).

Clamping sleeve 4 includes an obliquely, radially inwardly extending first section 7 in a front area 6 facing mating contact element 62. In the front area, a diameter D of clamping sleeve 4 decreases from a first diameter D1 to a second diameter D2.

A second section 8 that extends essentially in parallel to insertion direction E adjoins first section 7 of clamping sleeve 4, viewed opposite insertion direction E. Diameter D of clamping sleeve 4 is constant in this second section 8; in present FIG. 1, this is second diameter D2.

Clamping sleeve 4 may, for example, be captively fixed to contact element 1 and may at the same time be displaceable. For this purpose, for example a link structure that predefines the possible displacement path of clamping sleeve 4 may be provided at contact element 1.

Contact element 1 in FIG. 1 includes a contact box 35 that surrounds contact lamellae 3. Contact lamellae 3 may, for example, be cut free from contact box 35. However, contact box 35 may also be designed as a box into which contact lamellae 3 are pushed or folded. At lower contact lamella 3 in FIG. 1, a front contact area 30 is adjoined, viewed along insertion direction E, by a middle section 31, which is adjoined by a fastening section 32 for fastening an electrical line or a cable 40. Cable 40 includes an electrical conductor 42, and insulation 41 that surrounds conductor 42. By way of example, an insulation crimp 37 and a line crimp 38 are provided here in fastening section 32 (each schematically illustrated in dashed lines), other types of fastening (for example, soldering, welding, etc.) also being possible. Insulation 41 of the cable in fastening section 32 is fixed via insulation crimp 37, and electrical conductor 42 is mechanically fastened and electrically connected to contact element 1 via line crimp 38.

An obliquely outwardly protruding, for example elastically reversibly deflectable, detent lance 9 is situated at contact box 35. This detent lance 9 may engage with a housing undercut 53 of housing 51 of plug connector 50, so that contact element 1 is captively situated in contact chamber 52 of housing 51, and is then locked in contact chamber 52. It is understood that an inverse arrangement is also possible; i.e., an undercut situated at contact element 1 engages with a housing detent lance situated at housing 51.

It is understood that contact box 35 may also be formed by the two contact lamellae 3. Likewise, detent lance 9 may be cut free from a contact lamella 3.

A combination of contact element 1 and mating contact element 62 may also be referred to as a contact arrangement 70, in particular when mating contact element 62 is inserted into contact element 1.

In the completely plugged-together state of plug connector 50 and mating plug connector 60, not illustrated in FIG. 1, clamping sleeve 4 is moved into second position P2 with the aid of mating contact element 62. The at least one contact lamella 3 may then rest against mating contact element 62 with a defined force transverse to insertion direction E.

It is clearly apparent in FIG. 1 that contact lamellae 3 are spaced apart from mating contact element 62 in radial direction R as long as clamping sleeve 4 is in first position P1. The insertion of mating contact element 62 into contact element 1 may thus take place largely free of force, and in particular no force is necessary to press contact lamellae 3 outwardly. The so-called "peck up" force peak, which otherwise results in a high initial insertion force, advantageously does not apply.

In addition to insertion direction E, radial direction R as well as a circumferential direction U circumferentially surrounding the insertion direction are indicated in FIG. 1 to facilitate orientation.

Figure 2A:
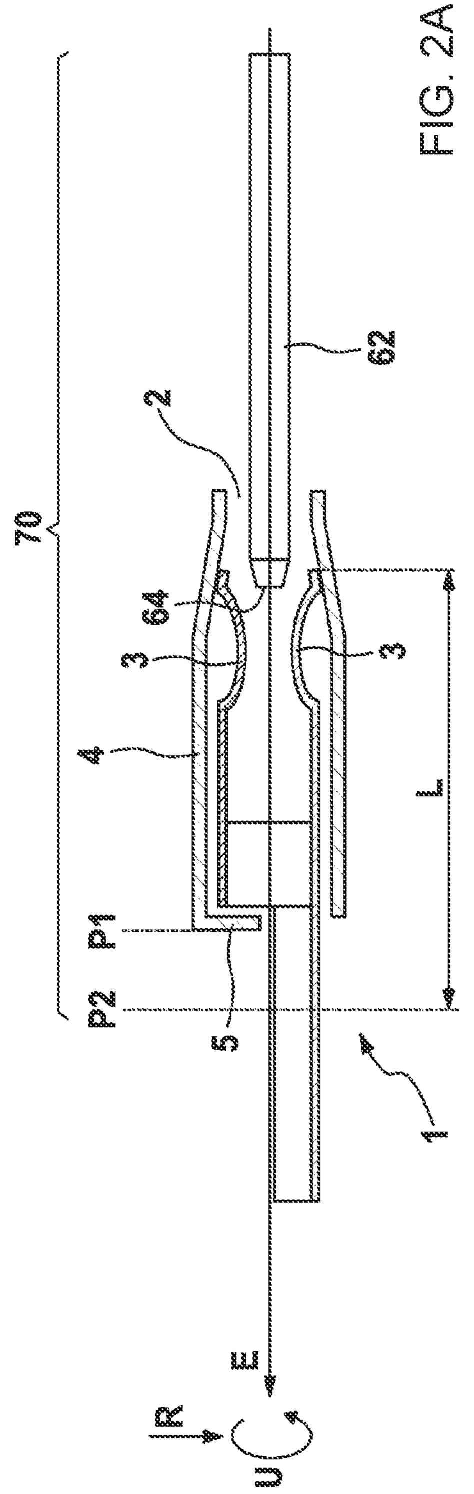
FIG. 2A shows a schematic cross section of a contact element with a clamping sleeve in the first position, in accordance with an example embodiment of the present invention.

FIG. 2A shows a simplified schematic cross section of a contact element 1 with clamping sleeve 4 in first position P1. Detent lance 9 has been omitted here for reasons of clarity. Mating contact element 62 is still in front of insertion opening 2 or is just passing through same. Insertion opening 2 is defined here by the front end of contact lamellae 3. Mating contact element 62 is thus situated at the beginning of the insertion path and thus at the start of a defined length L of the insertion path. This insertion path is ended here when mating contact element 62 is completely inserted, i.e., is in a final insertion position.

FIG. 2A illustrates contact element 1 without a contact box 35 surrounding contact lamellae 3. However, in principle the box formed by contact lamellae 3 could also be regarded as a contact box 35.

Figure 2B:
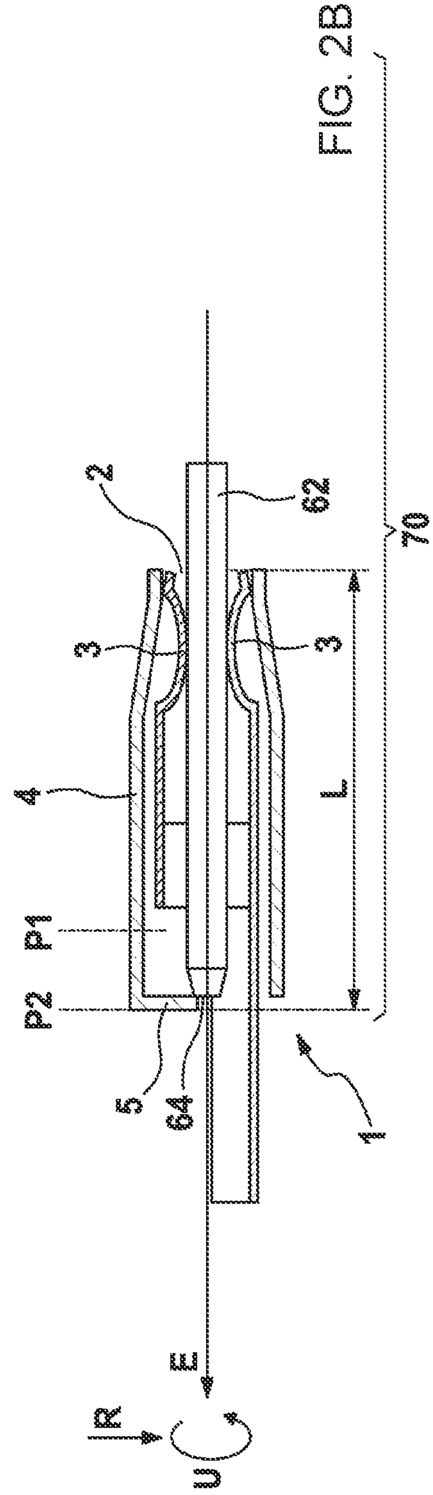
FIG. 2B shows a schematic cross section of the contact element from FIG. 2A with an inserted mating contact element in the final insertion position, and the clamping sleeve in the second position, in accordance with an example embodiment of the present invention.

FIG. 2B shows a schematic cross section of contact element 1 from FIG. 2A, with inserted mating contact element 62 in the final insertion position and clamping sleeve 4 in second position P2.

It is clearly apparent that during the insertion operation, mating contact element 62 with its free end 64 or with its tip has struck run-up element 5 after approximately 75% of defined length L of the insertion path. Upon further insertion, run-up element 5 has entrained or carried clamping sleeve 4 along the insertion path, and thus moved the clamping sleeve relative to contact lamellae 3 from first position P1 into second position P2. Run-up element 5 and clamping sleeve 4 are in operative connection for example, for example due to a relatively rigid coupling or in such a way that run-up element 5 is only slightly tilted relative to its rest position when mating contact element 62 strikes run-up element 5.

Due to the displacement of clamping sleeve 4 into second position P2, contact lamellae 3 strike an inner wall of clamping sleeve 4 in its first section 7, in which diameter D of clamping sleeve 4 decreases. As a result, contact lamellae 3 are deflected radially inwardly and thus pressed against mating contact element 62 toward the end of the insertion path. Shortly before the end of defined length L of the insertion path, diameter D of the clamping sleeve thus remains constant in its second section 8, so that the contact force that results likewise remains constant.

Figures 3A, 3B, 3C:
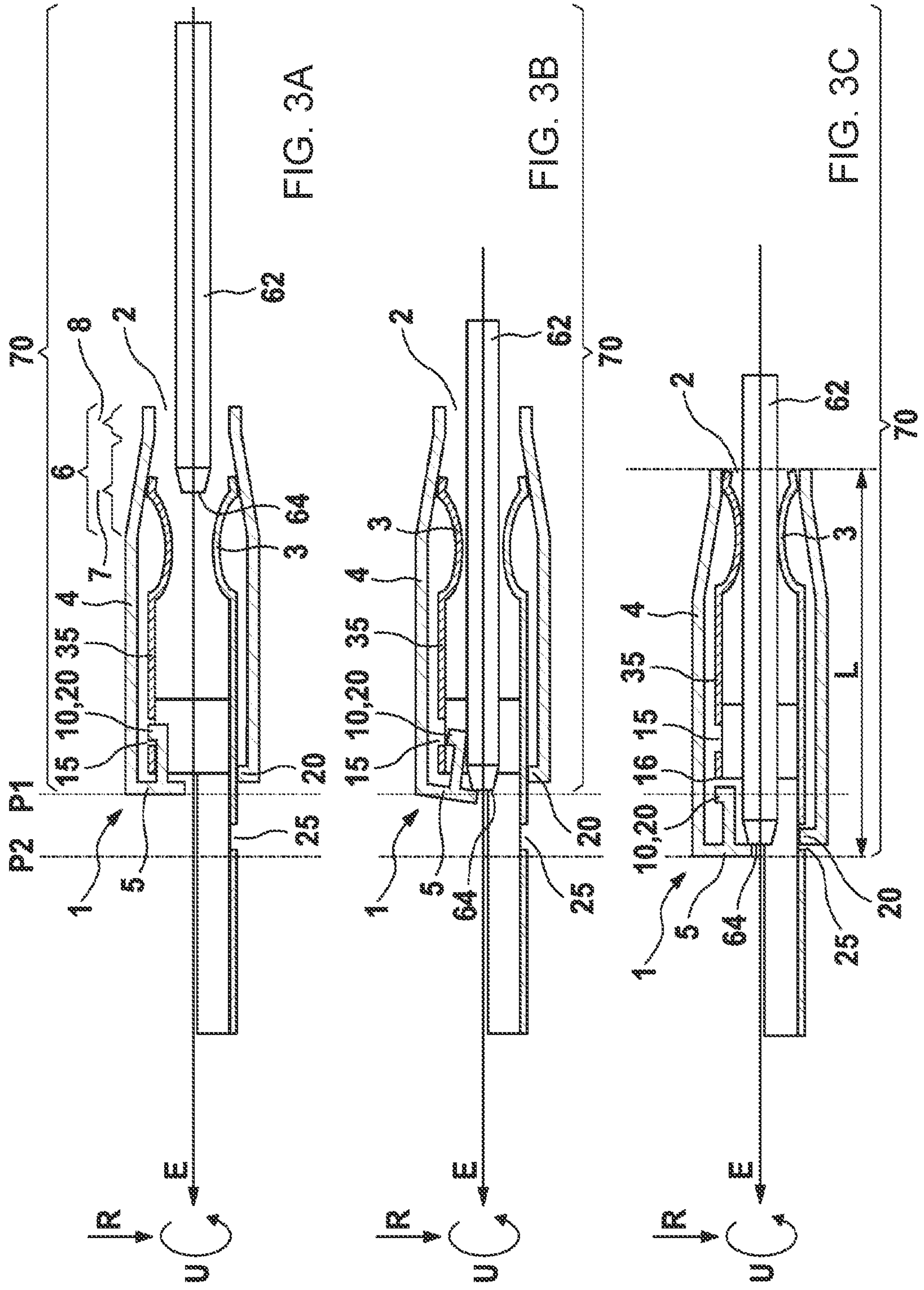
FIG. 3A shows a schematic cross section of a further contact element with a clamping sleeve in the first position, in accordance with an example embodiment of the present invention.
FIG. 3B shows a schematic cross section of the contact element from FIG. 3A, in which a mating contact element is inserted and is just striking a run-up element of the contact element, the clamping sleeve still being in the first position.
FIG. 3*c* shows a schematic cross section of the contact element from FIGS. 3A and 3B with an inserted mating contact element in the final insertion position, and the clamping sleeve in the second position.

FIG. 3A shows a schematic cross section of a further contact element 1 with clamping sleeve 4 in first position P1. Here as well, detent lance 9 is not illustrated for reasons of clarity. Contact element 1 from FIG. 3A differs from that in FIG. 2A, in that a first retaining element 10 and a second retaining element 20 are formed or situated or provided at clamping sleeve 4.

FIGS. 3B and 3C show contact element 1 from FIG. 3A upon further insertion of mating contact element 62 along various sections of defined length L of the insertion path.

FIG. 3B shows a state in which mating contact element 62 is inserted into contact element 1 and is just striking run-up element 5 of contact element 1, clamping sleeve 4 still being in first position P1.

FIG. 3C then shows contact element 1 with inserted mating contact element 62 in the final insertion position and with clamping sleeve 4 in second position P2.

First retaining element 10 is designed as a type of detent hook. This detent hook engages behind a first undercut 15 of contact box 35 when or as long as clamping sleeve 4 is in first position P1. First retaining element 10 thus prevents an inadvertent displacement of clamping sleeve 4 from first position P1 in the direction of second position P2 when no mating contact element 62 is inserted into contact element 1. It is apparent from FIG. 3A that first retaining element 10 is in operative connection with run-up element 5. In FIG. 3A, first retaining element 10, which is designed as a detent hook strictly by way of example, is designed, for example, in one piece with run-up element 5. The first retaining element protrudes from run-up element 5 approximately in parallel to insertion direction E in the direction of insertion opening 2, the detent hook being formed at the free end of first retaining element 10 and protruding radially outwardly.

Second retaining element 20 is provided to prevent a displacement of clamping sleeve 4 from second position P2 in the direction of first position P1 when clamping sleeve 4 is in second position P2 (cf. FIG. 3C in this regard).

Second retaining element 20 is present in duplicate here. First, in FIG. 3A a radially inwardly directed detent hook is formed at the lower part of clamping sleeve 4, at its end facing away from insertion opening 2. This detent hook may be formed, for example, by folding over clamping sleeve 4 radially inwardly. As a complement thereto, in FIG. 3A at lower contact lamella 3, a second recess 25 is provided in the area of second position P2, into which this second retaining element 20, designed as a detent hook, may engage when the clamping sleeve has reached second position P2 (FIG. 3C).

As is apparent in FIGS. 3A and 3C, in this specific embodiment first retaining element 10 is simultaneously used, strictly by way of example, also as second retaining element 20. Upon striking by mating contact element 62, run-up element 5 may have been elastically reversibly deflected in the manner of a spring in the direction of insertion direction E. As soon as first retaining element 10, situated between upper contact lamella 3 in FIG. 3A and mating contact element 62, has passed an end of contact lamella 3 facing away from insertion opening 2 and the application of force by mating contact element 62 decreases, run-up element 5 may spring back into its rest position (FIG. 3C). In this way, the detent hook of first retaining element 10 may engage behind the end of upper contact lamella 3 in FIG. 3A, and may thus prevent an inadvertent reverse displacement of clamping sleeve 4 from second position P2 into first position P1. First retaining element 10 may thus also simultaneously have a double function here, the same as with second retaining element 20.

It is understood that there may also be specific embodiments in which only a single retaining element 10, 20 having a double function is provided. However, there may also be specific embodiments in which each retaining element is used either only as a first retaining element 10 or only as a second retaining element 20.

FIG. 3B shows that run-up element 5 is tilted slightly along insertion direction E due to being struck by mating contact element 62. First retaining element 10 designed as a detent hook is thus released. This is because the detent hook tilts out of first undercut 15. As a result, clamping sleeve 4 may be displaced from first position P1 in the direction of second position P2 by the further movement of mating contact element 62 along insertion direction E.

To remove mating contact element 62 from contact element 1, for example for maintenance purposes, clamping sleeve 4 may be moved from second position P2 into first position P1, as the result of which contact lamellae 3 are released from front area 6 of the clamping sleeve and spring radially outwardly. They are thus removed or detached from mating contact element 62, and may subsequently be removed from contact element 1 (essentially) free of force. When the clamping sleeve is moved from second position P2 into first position P1, mating contact element 62 may, for example, already be carried along in the direction of the insertion opening with the aid of run-up element 5.

For contact elements 1 that include a second retaining element 20, the second retaining element is preferably to be unlocked or released prior to the displacement of clamping sleeve 4 from second position P2 into first position P1. This may take place with the aid of an unlocking tool, for example, which for example frees a detent hook, which engages behind an undercut, from this engaged-from-behind state.

In conclusion, it is noted that contact element 1 or contact arrangement 70 or plug connector 50 or plug connector arrangement 100 is or may be intended, suited, or configured, for example, for application or use in motor vehicles or in inverters, motors, control units, batteries, charging devices, or generators. However, contact element 1 or contact arrangement 70 or plug connector 50 or plug connector arrangement 100 is not limited to such applications or uses.

What is claimed is:

1. A contact element for inserting a mating contact element along an insertion direction, the contact element comprising:

an insertion opening for inserting the mating contact element;

at least one contact lamella configured to electrically contact the mating contact element; and a clamping sleeve that is displaceable, along the insertion direction, relative to the at least one contact lamella, between a first position and a second position, the clamping sleeve and the at least one contact lamella being in an operational relationship with one another in such a way that when the clamping sleeve moves from the first position into the second position, the at least one contact lamella is moved radially inwardly, perpendicular to the insertion direction, the clamping sleeve including a run-up element, which in a projection along the insertion direction through the insertion opening, at least partially covers the insertion opening, so that upon insertion of the mating contact element into the contact element, the mating contact element strikes the run-up element, and upon further insertion of the mating contact element, the clamping sleeve is moved in the direction of the second position with the aid of the run-up element, wherein:

the contact element includes, at the clamping sleeve, a first retaining element that prevents a displacement of the clamping sleeve from the first position in the direction of the second position when no mating contact element is inserted into the contact element; and the first retaining element is in operative connection with the run-up element such that, due to the operative connection, a deformation of the run-up element occurs with a deflection of the first retaining element.

2. The contact element as recited in claim 1, wherein the first retaining element is a protrusion that extends radially from a surface of the clamping sleeve in a direction away from a center of the clamping sleeve outwards towards an exterior of the contact element.

3. The contact element as recited in claim 1, wherein a second retaining element, which is different than the first contact element, is provided at the clamping sleeve, the second retaining element preventing a displacement of the clamping sleeve from the second position in the direction of the first position when the clamping sleeve is in the second position.

4. The contact element as recited in claim 1, wherein the first retaining element also prevents a displacement of the clamping sleeve from the second position in the direction of the first position when the clamping sleeve is in the second position.

5. The contact element as recited in claim 1, wherein a detent lance, which is elastically reversibly deflectable, is provided at the contact element for locking the contact element in a contact chamber of a plug connector.

6. The contact element as recited in claim 1, wherein:

the run-up element is deflectable by a pressure exerted by the mating contact element on the run-up element in the insertion direction with a continued insertion force after the mating contact element abuts against the run-up element;

an angle of an extension of the run-up element relative to the insertion direction changes by the deflection from being at a first angle value to being at a second angle value; and the first retaining element is connected to the run-up element so that, with the deflection of the run-up element, the first retaining element shifts, in a first radial direction, radially out of a retaining slot from a first radial position to a second radial position, thereby freeing the clamping sleeve to be able to have the displacement of the clamping sleeve from the first position in the direction of the second position.

7. The contact element as recited in claim 6, wherein, when the clamping sleeve is at the second position, the angle of extension of the run-up element is again at the first angle value, and the first retaining element is again at the first radial position.

8. The contact element as recited in claim 6, wherein the slot is formed in the at least one contact lamella.

9. The contact element as recited in claim 1, wherein the clamping sleeve includes:

a first section in which the inner surface of the clamping sleeve extends obliquely relative to the insertion direction so that, in the first section, a diameter of the clamping sleeve decreases opposite to the insertion direction; and a second section that does not extend obliquely relative to the insertion direction with a decreasing diameter opposite to the insertion direction and that is more distal than the first section from the receiving end of the clamping sleeve at which the mating contact element enters into the clamping sleeve.

10. The contact element as recited in claim 1, wherein the clamping sleeve includes:

a first section in which the inner surface of the clamping sleeve extends obliquely relative to the insertion direction so that, in the first section, a diameter of the clamping sleeve decreases opposite to the insertion direction; and a second section in which the inner surface of the clamping sleeve extends parallel to the insertion direction so that the diameter of the clamping sleeve remains constant in the second section, the clamping sleeve and the at least one contact lamella being arranged relative to each other such that, when the clamping sleeve is in motion from the first position to the second position, the surface of the at least one contact lamella slides against the inner surface of the clamping sleeve in the first section causing the radially inward movement of the at least one contact lamella, and such that, when the clamping sleeve is in the second position, the surface of the at least one contact lamella is pressed outwardly against the inner surface of the clamping sleeve in the second section.

11. The contact element as recited in claim 1, wherein, when the clamping sleeve is in the first position, first retaining element performs a locking function that locks the clamping sleeve against being displaced from the first position in the direction of the second position when no mating contact element is inserted into the contact element.

12. A contact arrangement, comprising:

a contact element for inserting a mating contact element along an insertion direction, the contact element including:

an insertion opening for inserting the mating contact element;

at least one contact lamella configured to electrically contact the mating contact element; and a clamping sleeve that is displaceable, along the insertion direction, relative to the at least one contact lamella, between a first position and a second position, the clamping sleeve and the at least one contact lamella being in an operational relationship with one another in such a way that when the clamping sleeve moves from the first position into the second position, the at least one contact lamella is moved radially inwardly, perpendicular to the insertion direction, the clamping sleeve including a run-up element, which in a projection along the insertion direction through the insertion opening, at least partially covers the insertion opening, so that upon insertion of the mating contact element into the contact element, the mating contact element strikes the run-up element, and upon further insertion of the mating contact element, the clamping sleeve is moved in the direction of the second position with the aid of the run-up element;

the mating contact element inserted into the contact element along the insertion direction;

wherein:

the contact element includes, at the clamping sleeve, a first retaining element that prevents a displacement of the clamping sleeve from the first position in the direction of the second position when no mating contact element is inserted into the contact element; and the first retaining element is in operative connection with the run-up element such that, due to the operative connection, a deformation of the run-up element occurs with a deflection of the first retaining element.

13. The contact arrangement as recited in claim 12, wherein the at least one contact lamella does not contact the mating contact element, at least as long as the mating contact element does not strike the run-up element, when the mating contact element is inserted into the contact element along the insertion direction.

14. The contact arrangement as recited in claim 12, wherein the at least one contact lamella rests against the mating contact element with a defined force transverse to the insertion direction when the clamping sleeve is in the second position.

15. A plug connector, comprising:

a housing with a contact chamber;

a contact element situated in the contact chamber, the contact element being locked in the contact chamber, the contact element configured for inserting a mating contact element along an insertion direction, the contact element including:

an insertion opening for inserting the mating contact element;

at least one contact lamella configured to electrically contact the mating contact element; and a clamping sleeve that is displaceable, along the insertion direction, relative to the at least one contact lamella, between a first position and a second position, the clamping sleeve and the at least one contact lamella being in an operational relationship with one another in such a way that when the clamping sleeve moves from the first position into the second position, the at least one contact lamella is moved radially inwardly, perpendicular to the insertion direction, the clamping sleeve including a run-up element, which in a projection along the insertion direction through the insertion opening, at least partially covers the insertion opening, so that upon insertion of the mating contact element into the contact element, the mating contact element strikes the run-up element, and upon further insertion of the mating contact element, the clamping sleeve is moved in the direction of the second position with the aid of the run-up element;

wherein:

the contact element includes, at the clamping sleeve, a first retaining element that prevents a displacement of the clamping sleeve from the first position in the direction of the second position when no mating contact element is inserted into the contact element; and the first retaining element is in operative connection with the run-up element such that, due to the operative connection, a deformation of the run-up element occurs with a deflection of the first retaining element.

16. A plug connector arrangement, comprising:

a plug connector including:

a housing with a contact chamber;

a contact element situated in the contact chamber, the contact element being locked in the contact chamber, the contact element configured for inserting a mating contact element along an insertion direction, the contact element including:

an insertion opening for inserting the mating contact element;

at least one contact lamella configured to electrically contact the mating contact element; and a clamping sleeve that is displaceable, along the insertion direction, relative to the at least one contact lamella, between a first position and a second position, the clamping sleeve and the at least one contact lamella being in an operational relationship with one another in such a way that when the clamping sleeve moves from the first position into the second position, the at least one contact lamella is moved radially inwardly, perpendicular to the insertion direction, the clamping sleeve including a run-up element, which in a projection along the insertion direction through the insertion opening, at least partially covers the insertion opening, so that upon insertion of the mating contact element into the contact element, the mating contact element strikes the run-up element, and upon further insertion of the mating contact element, the clamping sleeve is moved in the direction of the second position with the aid of the run-up element; and a mating plug connector including:

a mating plug connector housing; and the mating contact element;

wherein:

in a completely plugged-together state of the plug connector and the mating plug connector, the clamping sleeve is moved into the second position with the aid of the mating contact element, the at least one contact lamella resting against the mating contact element with a defined force transverse to the insertion direction;

the contact element includes, at the clamping sleeve, a first retaining element that prevents a displacement of the clamping sleeve from the first position in the direction of the second position when no mating contact element is inserted into the contact element; and the first retaining element is in operative connection with the run-up element such that, due to the operative connection, a deformation of the run-up element occurs with a deflection of the first retaining element.

* * * * *